United States Patent [19]

Yamaguchi et al.

[11] Patent Number: 5,156,933
[45] Date of Patent: Oct. 20, 1992

[54] METHOD OF MANUFACTURING MANGANESE DIOXIDE

[75] Inventors: Munetoshi Yamaguchi; Yoshinobu Nakamura; Hirohisa Senzaki, all of Takehara, Japan

[73] Assignee: Mitsui Mining & Smelting Co., Ltd., Tokyo, Japan

[21] Appl. No.: 684,169

[22] Filed: Apr. 11, 1991

Related U.S. Application Data

[63] Continuation-in-part of Ser. No. 444,108, Nov. 30, 1989, abandoned.

[30] Foreign Application Priority Data

Jul. 12, 1988 [JP] Japan .................. 63-309396

[51] Int. Cl.$^5$ ............................. H01M 4/50
[52] U.S. Cl. ................... 429/224; 204/96; 205/57
[58] Field of Search .......... 204/2.1, 96; 429/224; 205/57

[56] References Cited

U.S. PATENT DOCUMENTS

| | | | |
|---|---|---|---|
| 4,069,116 | 1/1978 | Dzhaparidze et al. | 204/96 |
| 4,465,747 | 8/1984 | Evans . | |
| 4,478,921 | 10/1984 | Langan . | |
| 4,863,817 | 9/1989 | Ogino et al. | 204/96 X |
| 4,997,531 | 5/1991 | Yoshio et al. | 204/96 |

FOREIGN PATENT DOCUMENTS

7202419 1/1972 Japan .
5755065 1/1982 Japan .

OTHER PUBLICATIONS

Chemical Abstracts, vol. 101, No. 20, Nov. 12th, 1984, p. 540, Abstract No. 179806W, Columbus, Ohio, US: F. Golumbioschi et al.
Chemical Abstracts, vol. 95, No. 1, Jul. 1981, p. 535, abstract No. 15024W, Columbus, Ohio, US; I. Tari et al.
Chemical Abstracts, vol. 77, No. 20, Nov. 13th, 1972, p. 560, abstract No. 1344ole, Columbus, Ohio, US.

*Primary Examiner*—Stephen Kalafut
*Attorney, Agent, or Firm*—Bucknam and Archer

[57] ABSTRACT

A method of manufacturing manganese dioxide containing 0.05 to 2.0 parts by weight of phosphorus which consists of introducing a manganese sulfate solution and sulfuric acid as an electrolyte into an electrolytic cell, adding to said electrolyte at least one member selected from the group consisting of phosphoric acid, phosphorous acid, hypophosphorous acid and compounds thereof and carrying out the electrolysis at a bath temperature of 92° to 100° C. whereby manganese dioxide containing phosphorus is electrodeposited on the cathode.

8 Claims, 3 Drawing Sheets

METHOD OF MANUFACTURING MANGANESE DIOXIDE

This application is a continuation-in-part of Ser. No. 444,108, filed Nov. 30, 1989, now abandoned.

BACKGROUND OF THE INVENTION

1. Field of the Invention

The present invention relates to a method of manufacturing manganese dioxide and, more specifically, it relates to such method of manufacturing manganese dioxide for a lithium primary cell using lithium or a lithium alloy as an anode active material and the manganese dioxide as a cathode active material.

2. Description of the Prior Art

Manganese dioxide and carbon fluoride are known as typical examples of a cathode active material of a lithium primary cell and are already commercially available.

Of these cathode active materials, manganese dioxide is advantageous since it has a good storage stability and is inexpensive.

A lithium primary cell using manganese dioxide as a cathode active material is currently applied to a camera and the like. As the multi-function of a camera has progressed, a demand has arisen for a lithium primary cell to have a high discharge voltage. A large discharge capacity, i.e., a long discharge time is also demanded for the lithium primary cell. No lithium primary cell, however, which can satisfy both the requirements with a good balance, has been proposed.

SUMMARY OF THE INVENTION

The present invention has been made in consideration of the above situation and is intended to provide a method of manufacturing manganese dioxide for a lithium primary cell which uses the manganese dioxide as a cathode active material and achieves both a high discharge voltage and a long discharge time.

The above object of the present invention is achieved by a method of manufacturing manganese dioxide containing 0.05 to 2.0 parts by weight of phosphorus per 100 parts by weight of manganese dioxide which consists of introducing a manganese sulfate solution and sulfuric acid as an electrolyte into an electrolytic cell, adding to said electrolyte at least one member selected from the group consisting of phosphoric acid, phosphorous acid, hypophosphorous acid and compounds thereof and carrying out the electrolysis at a bath temperature of 92° to 100° C. whereby manganese dioxide containing phosphorus is electrodeposited on the cathode.

Further, the above object of the present invention is achieved by adding 0.05 to 2.0 parts by weight of phosphorus to 100 parts by weight of manganese dioxide and using the resultant material as a cathode active material of a lithium primary cell.

Manganese dioxide containing phosphorus obtained by the method of the present invention is preferably used as a cathode active material. When this cathode active material is used for manufacturing a lithium primary cell, both a high discharge voltage and a long discharge time are achieved.

The content of phosphorus is generally 0.05 to 2.0 parts by weight with respect to 100 parts by weight of manganese dioxide. If the phosphorus content is less than 0.05 parts by weight with respect to 100 parts by weight of manganese dioxide, no sufficient addition effect is obtained in terms of discharge characteristics of a manufactured lithium primary cell. If the phosphorus content exceeds 2.0 parts by weight, the discharge characteristics of manganese dioxide of the manufactured lithium primary cell inferior.

Such manganese dioxide containing phosphorus is manufactured by the following method.

That is, manganese dioxide containing phosphorus is manufactured by adding phosphoric acid, phosphorus acid, hypophosphorous acid, or a compound thereof to an electrolyte during the manufacture of electrolytic manganese dioxide by electrolysis using manganous sulfate and a sulfuric acid solution as the electrolyte.

In this manufacturing method, manganese sulfate and a sulfuric acid solution are used as an electrolyte. Generally, in this electrolyte, the manganese concentration is 20 to 50 g/l, and the sulfuric acid concentration is 30 to 80 g/l. In addition, as electrodes, titanium or the like, preferably titanium, is used as a cathode, and carbon or the like is used as an anode.

Electrolytic conditions for electrolytic manganese dioxide are necessarily a bath temperature of 92° to 100° C., and preferably a current density of 30 to 100 A/m$^2$.

In the case where the bath temperature is less than 92° C., passivation occurs on the surface of the cathode used during electrolysis, thereby raising the increase of the electrolytic voltage per one cell and rendering the cathode unusable in a few days.

In this manufacturing method, phosphoric acid, phosphorous acid, hypophosphorous acid, or a compound thereof is added to the electrolyte. Examples of the compound are a sodium salt, a potassium salt, and the like of phosphoric acid, phosphorous acid, and hypophosphorous acid. The phosphoric acid compound or the like is uniformly added together with a manganese sulfate supply solution from an upper portion of an electrolytic cell to between electrode plates.

The concentration of the phosphoric acid compound or the like in the electrolyte is set to be 0.1 to 3.0 g/l, and the electrolytic conditions are adjusted so that phosphorus is contained in an amount falling within the above range in the manufactured electrolytic manganese dioxide.

The electrolytic manganese dioxide manufactured as described above has a large specific surface area of 40 to 150 m$^2$/g. If the specific surface area of the electrolytic manganese dioxide is smaller than the above value, the reaction area with respect to an electrolyte is small and the load discharge performance is weak when this electrolytic manganese dioxide is used as a cathode active material to manufacture a lithium primary cell. If the specific surface area of electrolytic manganese dioxide exceeds the above value, the cathode agent becomes bulky. The specific surface area of electrolytic manganese dioxide can be adjusted by arbitrarily selecting the type or content of the phosphoric acid compound.

A lithium primary cell, manufactured under normal conditions by using electrolytic manganese dioxide containing phosphorus as a cathode active material and lithium or a lithium alloy such as lithium-aluminum as an anode, has a higher discharge voltage and a longer discharge time than those of a conventional lithium primary cell.

DETAILED DESCRIPTION OF THE PREFERRED EMBODIMENT

The present invention will be described in detail below by way of its examples.

EXAMPLE 1

A titanium plate as a cathode and a graphite plate as an anode were alternately suspended in an electrolytic cell having a volume of 3 l and equipped with a heating apparatus, and an addition tube was connected to the bottom portion of the electrolytic cell to add an electrolytic supply solution composed of manganese sulfate and a phosphoric acid solution.

The electrolytic supply solution was adjusted so that 0.5 g/l of phosphoric acid were contained in the manganese sulfate solution.

When electrolysis was performed by supplying the supply solution in the electrolytic cell, the composition of the electrolyte was adjusted so that 50 g/l of manganese and 30 g/l of sulfuric acid were contained. Electrolysis was performed at a bath temperature of $95° \pm 1°$ C. and a current density of 100 A/m$^2$.

Figure 4:
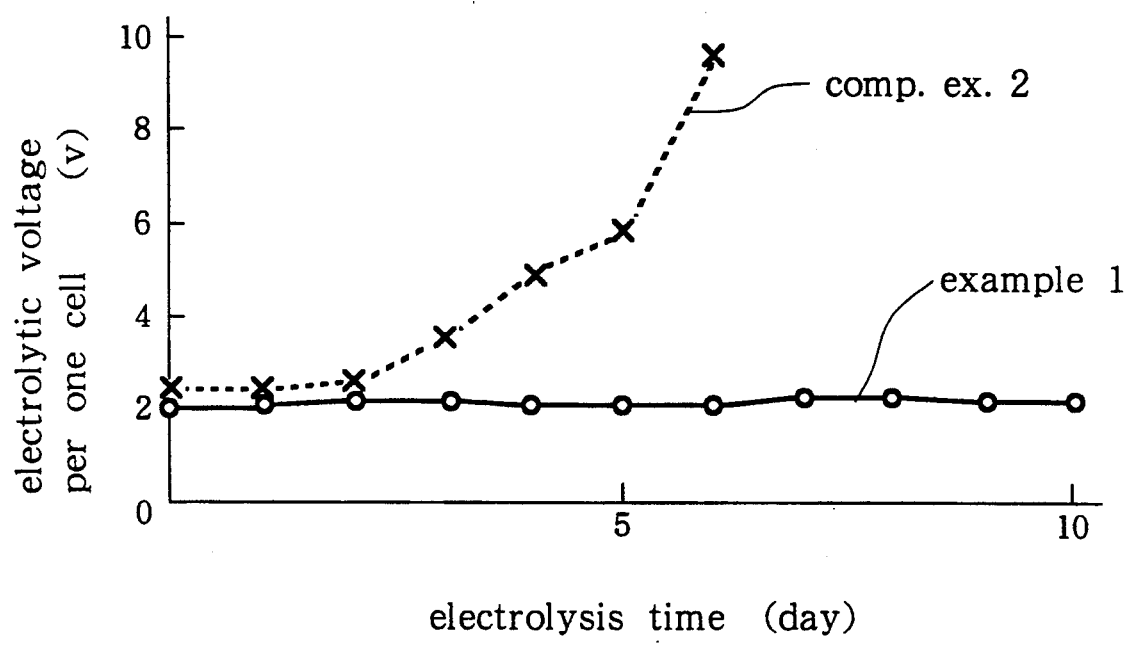
FIG. 4 is a graph showing the relationship between the electrolytic voltage per one cell and the electrolysis time in one example and a comparative example.

The relationship between the electrolytic voltage per one cell and the electrolysis time during the electrolysis is shown in FIG. 4.

After electrolysis was finished, the cathode plate on which electrolytic manganese dioxide was electrodeposited was removed from the cell and subjected to a normal post-treatment, and the specific surface area of the obtained electrolytic manganese dioxide was measured. The measurement results are listed in Table 1.

A heat treatment was performed at 400° C. for three hours, 0.135 g of the obtained electrolytic manganese dioxide were measured, and 0.09 g of graphite and 0.06 g of an tetrafluoroethylene resin were mixed therewith. The resultant mixture was pressure-molded at 3 t/cm$^2$ to prepare a cathode mixture. Note that the manganese dioxide, the graphite and the tetrafluoroethylene were predried and mixed.

Figure 1:
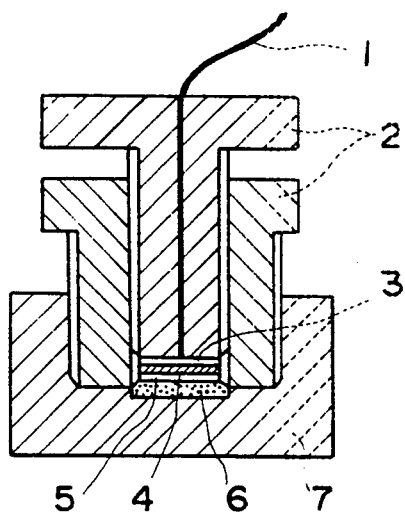
FIG. 1 is a schematic sectional view for explaining a test cell used in examples and a comparative example.

The prepared cathode mixture was used to form a test cell as shown in FIG. 1, and a 2.5-KΩ continuous discharge test was performed at 20° C. All these operations were performed in a dry box in an argon atmosphere. The electrolyte was prepared by dissolving 1 mol/l of lithium perchlorate in a 1:1 solvent mixture of propylenecarbonate and 1,2-dimethoxyethane. The reagent used in this test was dried by a conventional method. In addition, the anode was formed by punching a metal lithium sheet to have the same diameter as that of the cathode mixture.

In the test cell shown in FIG. 1, reference numeral 1 denotes an anode terminal for externally extracting a current; and 2, insulating members made of a teflon resin. The insulating members 2 are threadably engaged with each other to close the cell. Reference numeral 3 denotes an anode plate; 4, a crimped metal lithium sheet (anode); 5, a separator made of a non-woven fabric; 6, a cathode mixture formed by the above method; and 7, a stainless steel cathode.

Figure 2:
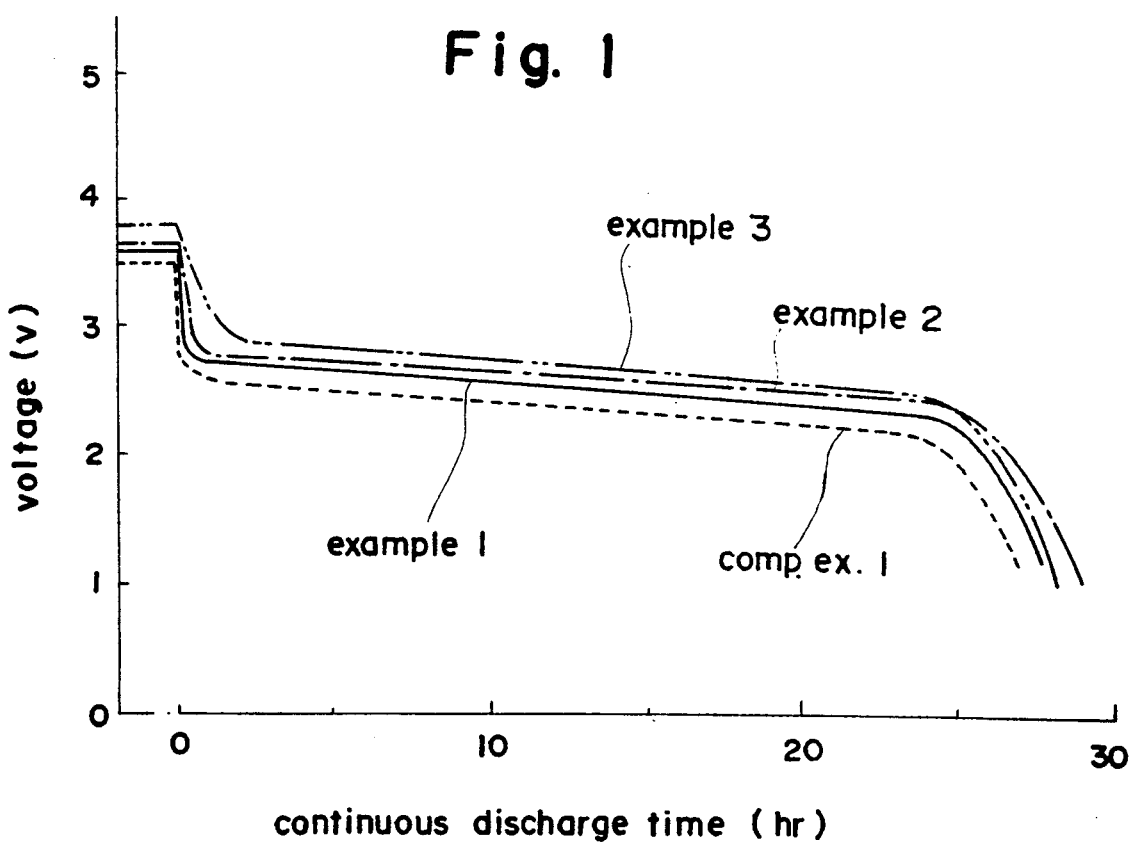
FIGS. 2 and 3 are graphs each showing the relationship between the voltage and the continuous discharge time in the examples and comparative example.

A discharge test was performed by using the above test cell. The obtained relationship between the voltage and the continuous discharge time is shown in FIG. 2.

EXAMPLES 2 and 3

By using an apparatus similar to that used in Example 1, electrolysis was performed by changing the phosphorus addition amount as listed in Table 1, and a post-treatment was performed following the same procedures as in Example 1. The specific surfaces area of the obtained electrolytic manganese dioxides are listed in Table 1.

A heat treatment was performed following the same procedures as in Example 1, and a test cell as shown in FIG. 1 was manufactured following the same procedures as in Example 1 by using each electrolytic manganese dioxide. A discharge test was performed by using this test cell. The obtained relationship between the voltage and the continuous discharge time is shown in FIG. 2.

EXAMPLES 4-7

By using an apparatus similar to that used in Example 1, electrolysis was performed by adding phosphorous acid, hypophosphorous acid, sodium tripolyphosphate, and potassium tripolyphosphate in amounts as listed in Table 1, instead of phosphoric acid, and a post-treatment was performed following the same procedures as in Example 1. The specific surfaces area of the obtained electrolytic manganese dioxides are listed in Table 1.

A heat treatment was performed following the same procedures as in Example 1, and a test cell was manufactured following the same procedures as in Example 1 by using each electrolytic manganese dioxide. A discharge test was performed by using this test cell. The obtained relationship between the voltage and the continuous discharge time is listed in FIG. 3.

COMPARATIVE EXAMPLE 1

By using an apparatus similar to that used in Example 1, electrolysis was performed following the same procedures as in Example 1 except that no phosphoric acid solution was added, and a post-treatment was performed following the same procedures as in Example 1. The specific surface area of the obtained electrolytic manganese dioxide is listed in Table 1.

Figure 3:
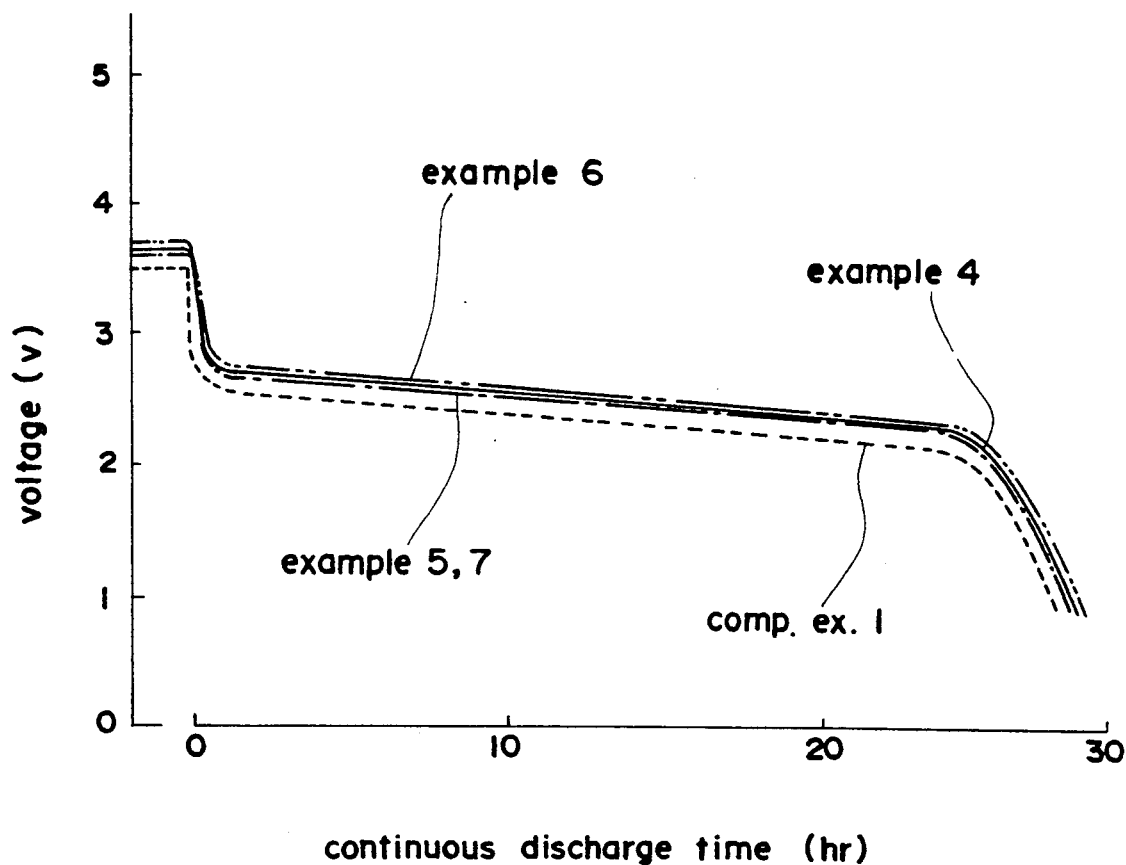

A heat treatment was performed following the same procedures as in Example 1, and a test cell as shown in FIG. 1 was manufactured following the same procedures as in Example 1 by using this electrolytic manganese dioxide. A discharge test was performed by using this test cell. The obtained relationship between the voltage and the continuous discharge time is shown in FIGS. 2 and 3 so as to be compared with the examples.

COMPARATIVE EXAMPLE 2

Electrolysis was performed following the same procedures as in Example 1 except that the bath temperature of $90° \pm 1°$ C. was substituted for $95° \pm 1°$ C.

The relationship between the electrolytic voltage per one cell and the electrolysis time during the electrolysis is shown in FIG. 4

TABLE 1

| Example Comparative Example | Electrolytic Conditions | | | | | Electrolytic Voltage (V) | Specific Surface area ($m^2/g$) | Phosphorus Content of Electrolytic Manganese Dioxide*[1] |
|---|---|---|---|---|---|---|---|---|
| | Current Density ($A/m^2$) | Electrolyte Composition | | | Addition Amount (g/l) | | | |
| | | Mn (g/l) | $H_2SO_4$ (g/l) | Additive | | | | |
| Example 1 | 100 | 50 | 30 | $H_3PO_4$ | 0.5 | 2.1 to 2.5 | 49 | 0.05 |
| Example 2 | 100 | 50 | 30 | $H_3PO_4$ | 1.0 | 2.1 to 2.3 | 63 | 0.52 |
| Example 3 | 100 | 50 | 30 | $H_3PO_4$ | 3.0 | 2.0 to 3.0 | 150 | 2.00 |
| Example 4 | 100 | 50 | 30 | $H_3PO_3$ | 0.5 | 1.8 to 2.1 | 56 | 0.63 |
| Example 5 | 100 | 50 | 30 | $Na_5P_3O_{10}$ | 1.0 | 1.6 to 2.0 | 60 | 1.53 |
| Example 6 | 100 | 50 | 30 | $K_5P_3O_{10}$ | 0.5 | 1.9 to 2.5 | 52 | 0.98 |
| Example 7 | 100 | 50 | 30 | $H_3PO_2$ | 0.5 | 1.8 to 2.1 | 60 | 0.68 |
| Comparative Example 1 | 100 | 50 | 30 | — | — | 1.9 to 2.3 | 38 | 0.0006 |

*[1] amount (parts by weight) with respect to 100 parts by weight of manganese dioxide As is apparent from FIGS. 2 and 3, the test cell obtained by each of Examples 1 to 7 had a much longer continuous discharge time and a higher operation voltage during discharge than those of the test cell obtained by Comparative Example 1. That is, each test cell according to the present invention had very good cell characteristics as a non-hydrous electrolyte cell.

As is apparent from FIG. 4, in Example 1 where the bath temperature is 95°±1° C., the electrolysis was able to be carried out stably over a long period of time to obtain electrolytic manganese dioxide without passivation of the surface of the cathode (titanium plate). In contrast, in Comparative Example 2 where the bath temperature is 90°±1° C., passivation occurred on the surface of the cathode during the electrolysis, thereby raising the increase of the electrolytic voltage per one cell and rendering the cathode unusable in a few days.

As has been described above, according to the method of the present invention, a phosphoric acid compound or the like is added to the electrolyte during the manufacture of electrolyte manganese dioxide by electrolysis using manganese sulfate and a sulfuric acid solution as the electrolyte. Therefore, the obtained electrolyte manganese dioxide has a larger specific surface area than that of conventional electrolytic manganese dioxide and contains a predetermined amount of phosphorus.

In addition, by using this electrolytic manganese dioxide containing phosphorus as a cathode active material of a lithium primary material, a high discharge voltage and a long discharge time can be achieved.

Since the high discharge voltage and long discharge time can be simultaneously achieved, cell characteristics of the lithium primary cell can be effectively improved.

What is claimed is:

1. A method of manufacturing manganese dioxide for a lithium primary cell containing 0.05 to 2.0 parts by weight of phosphorus per 100 parts by weight of manganese dioxide which consists of introducing a manganese sulfate solution and sulfuric acid as an electrolyte into an electrolytic cell, adding to said electrolyte at least one member selected from the group consisting of phosphoric acid, phosphorous acid, hypophosphorous acid and compounds thereof and carrying out the electrolysis at a bath temperature of 92° to 100° C. whereby manganese dioxide containing phosphorus is electrodeposited on the cathode.

2. The method according to claim 1 wherein said member added to said electrolyte is phosphoric acid.

3. The method according to claim 1 wherein said electrolysis is carried out at a current density of 30 to 100 $A/m^2$.

4. The method according to claim 2 wherein said electrolysis is carried out at a current density of 30 to 100 $A/m^2$.

5. The method according to claim 1 wherein a manganese concentration of said electrolyte is 20 to 50 g/l.

6. The method according to claim 1 wherein a sulfuric acid concentration of said electrolyte is 30 to 80 g/l.

7. A lithium primary cell wherein lithium or a lithium alloy is the anode active material and manganese dioxide is the cathode active material wherein said manganese dioxide contains 0.05-2 parts of phosphorus per 100 parts of manganese dioxide by weight, said manganese dioxide being prepared by introducing a manganese sulfate solution and sulfuric acid as an electrolyte into an electrolytic cell, adding to said electrolyte at least one member selected from the group consisting of phosphoric acid, phosphorous acid, hypophosphorous acid and compounds thereof and carrying out the electrolysis at a bath temperature of 92° to 100° C. whereby manganese dioxide containing phosphorus is electrodeposited on the cathode.

8. The lithium primary cell according to claim 7 which exhibits higher discharge voltage and higher discharge time compared with a lithium primary cell wherein the manganese dioxide is devoid of a phosphorus compound.

* * * * *